United States Patent [19]

Pellarini

[11] 4,030,688

[45] June 21, 1977

[54] AIRCRAFT STRUCTURES

[76] Inventor: Luigi Pellarini, 30 Lachlan Ave., Sylvania, New South Wales 2224, Australia

[22] Filed: Feb. 18, 1975

[21] Appl. No.: 550,855

[30] Foreign Application Priority Data

Feb. 26, 1974 Australia .................. 6731/74

[52] U.S. Cl. .................. 244/13; 244/36; 244/45 A; 244/118 P

[51] Int. Cl.² ......................... B64C 3/08

[58] Field of Search ........... 244/13, 35 R, 36, 45 R, 244/45 A, 15, 34 R, 124, 118 R, 118 P, 54, 55; D12/71, 77, 78

[56] References Cited

UNITED STATES PATENTS

| | | | |
|---|---|---|---|
| 2,268,009 | 12/1941 | Babb et al. | 244/118 R |
| 2,380,289 | 7/1945 | Burnelli | 244/124 |
| 2,421,694 | 6/1947 | Hawkins | 244/45 A |
| 2,572,442 | 10/1951 | Burnelli | 244/118 P |
| 3,188,022 | 6/1965 | Ornberg | 244/45 A |
| 3,276,722 | 10/1966 | Eggers et al. | 244/36 |
| 3,642,234 | 2/1972 | Kamber et al. | 244/45 A |
| D145,145 | 7/1946 | Riegel | D12/78 |
| D155,569 | 10/1949 | Bailey | D12/77 |
| D166,843 | 5/1952 | Bailey | D12/78 |
| D196,343 | 9/1963 | Norman et al. | 244/13 |
| D205,328 | 7/1966 | Henry et al. | D12/78 |

FOREIGN PATENTS OR APPLICATIONS 982,614  6/1951  France .................. 244/36

*Primary Examiner*—Trygve M. Blix
*Assistant Examiner*—Galen L. Barefoot
*Attorney, Agent, or Firm*—McNenny, Pearne, Gordon, Gail, Dickinson & Schiller

[57] ABSTRACT

Improvements in and relating to aircraft structures. The aircraft comprises a narrow delta planform fuselage with two small-span shoulder type wings in tandem and cascade. The shape of the fuselage and its relationship with the wings result in an aircraft capable of exploiting more efficiently, than conventional aircrafts, the potential energy carried by the aircraft and to comply more accurately with the first degree of universal flexibility as does the atmospheric environment than do conventional aircrafts.

9 Claims, 13 Drawing Figures

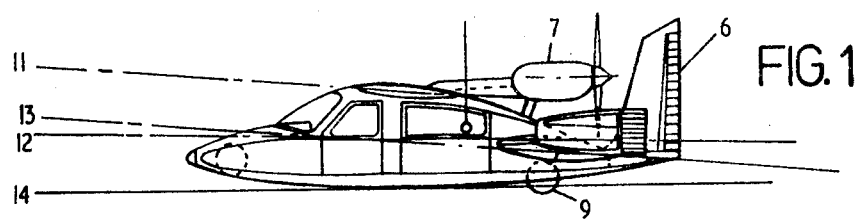
FIG. 1
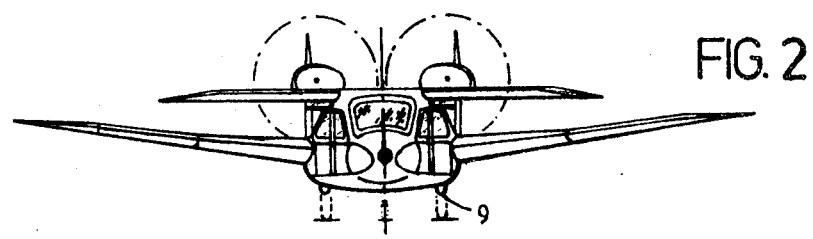
FIG. 2
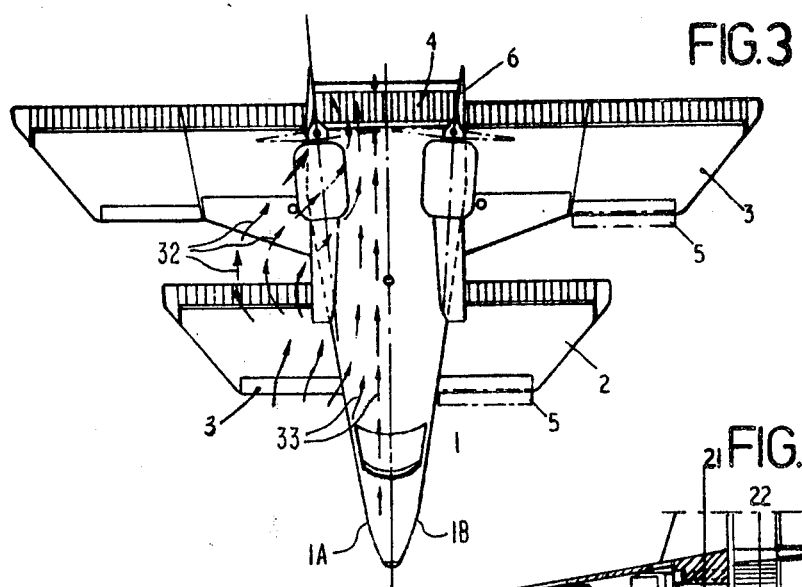
FIG. 3
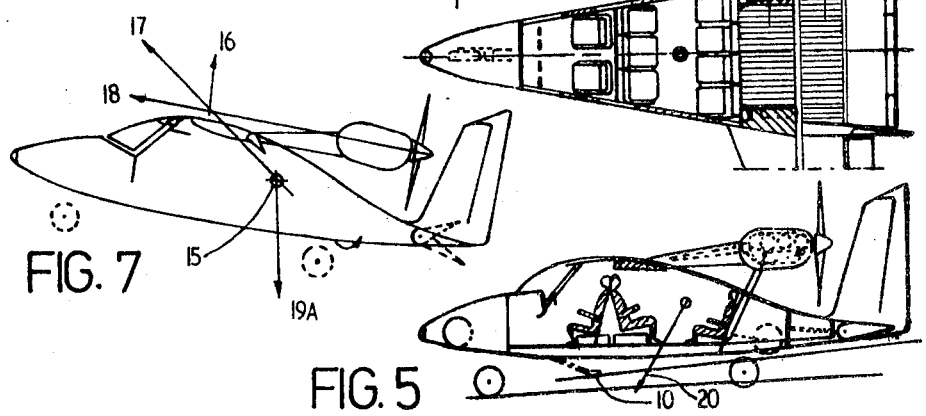

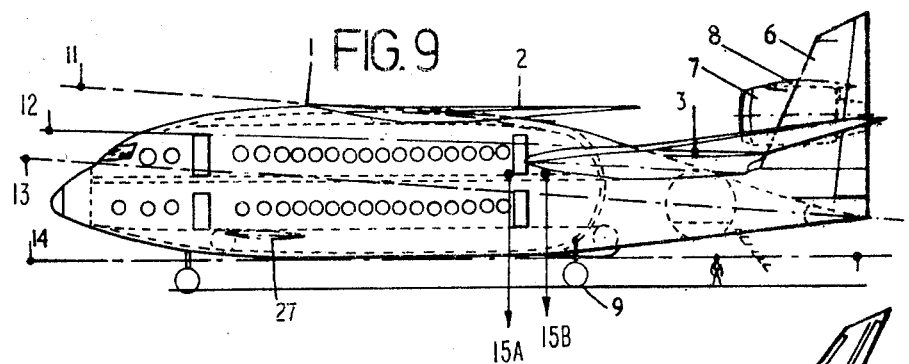
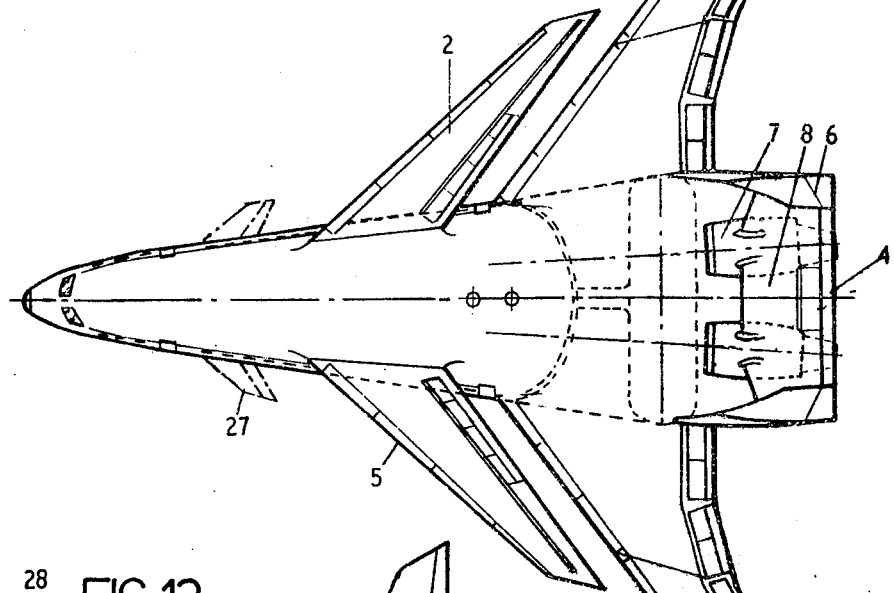
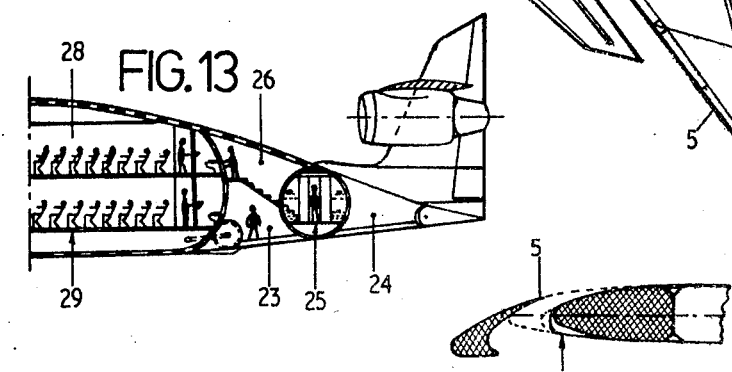

AIRCRAFT STRUCTURES

This present invention relates to subsonic aeroplanes, of any subsonic speed potential or of any size and use, which are endowed with a much greater economic potential than equivalent aeroplanes presently known, of equivalent size and power.

As these aeroplanes, which form the object of the present invention, are endowed also with a different configuration as compared to known aeroplanes, they are called airdynecrafts, for distinction.

The airdynecraft's new configurations and high economic potential are obtained by using known components most of which perhaps are common to any other existing aircraft, which components, however, are assembled in one final unit according to a new design pattern so as, ultimately, to obtain a flying craft capable to exploit more efficiently the potential energy that it carries and able also to comply more accurately with the first degree of flexibility of the atmospheric environment than the already known aircraft types.

The main advantages of airdynecraft of the present invention, as compared to the same category of payload capability aircraft of current standard design, are:
1. Total utilisation of fuselage volume;
2. Less sructural penalty (due to aero-elastic fatigue);
3. Embodiment throughout of fail-safe concepts at no weight penalty;
4. Greater safety in emergency Take-Off Landings;
5. Comparatively much smaller overall dimensions and empty weight and therefore manufacturing cost;
6. More centralised thrust line with power-plant acting at rear of the fuselage;
7. Minimum shift of centre of gravity from empty to all up weight arrangements due to triangular distributions of payload into the delta planform fuselage;
8. Relatively smaller mass inertia about co-ordinates Y and Z.
9. Less wetted area to lift area ratio thereforce $C_L/C_D$ max. substantially enhanced ($C_D$ is the co-efficient of drag; and $C_L$ is the co-efficient of lift);
10. Smaller wing loadings relative to wetted area and aspect ratio;
11. Less power required relative to payload and reduced operating cost; less noise and pollution;
12. Intrinsic antiauto rotation characteristic due to fuselage lift above centre of gravity;
13. Increased payload to structural weight ratio, (due to self lifting fuselage);
14. Softer and shorter Take-Off-Landings due to forward wing and fuselage cushion ground effect;
15. Substantial total lift gain due to fuselage in spite of the airflow momentum losses due to tandem wings in cascade of airfoils;
16. Enhanced total lift due to forward wing left and power plant thrust relationship;
17. Approximate spanwise eliptical distribution of overall lift;
18. Less yawing and rolling unbalanced moments in the event of engine failure;
19. Minimum structural damage in emergency landings;
20. Multiplicity of common and interchangeable components of comparably small size (economy);
21. Sectional fuselage in smaller size aircraft (manufacturing economy);
22. Larger useful floor areas for payload (passengers and/or cargo);
23. Versatility of use;
24. Panoramic vision (small size aircraft);
25. Clean lifting surfaces free from engine presence (lower wing drag);
26. Shorter undercarriages;
27. Protection of engines from birds and debris — fire hazard greatly reduced);
28. Life saving factor unparallelingly high even in the event of landings on water.

In one broad form the invention comprises an airdynecraft provided with a streamlined delta planform shaped fuselage, longitudinal airfoil sections which can vary their camber, two shoulder wings, in tandem and cascade, at negative angles of incidence in respect of the zero lift angle of the fuselage, and a power plant system, located wholly or partly on top of the rear section of the fuselage; said fuselage also carries internal compartments for payloads which are devised and arranged in accordance with both the planform tapering and the flying attitude (angle of attack) of the airdynecraft.

In another form the airdynecraft comprises a narrow delta or approximately delta planform fuselage with a parabolically streamlined nose whose longitudinal section contours form low drag high lift aerodynamic airfoils of variable camber (and therefore of variable aerodynamic characteristics), said delta planform fuselage carrying two comparatively small-span shoulder type wings, in a close tandem set and in narrow cascade of airfoils, whose mean aerodynamic chords form small positive angles, or even negative angles of incidence in respect to the zero-lift incidence of the fuselage mean aerodynamic chord and said delta fuselage carries the full power plant system or a portion of it above its upper skin, and as far as possible rearward in respect to its centre of gravity.

In the accompanying drawings which are shown merely by way of example and illustration, two preferred forms of embodiments of the present invention approximately at the beginning and at the end of a vast range of intermediate practical applications in accordance with payloads and speeds are shown.

The invention and its advantages shall become clearer from the following description with reference to the accompanying drawing in which:

FIGS. 1, 2 and 3 represent basic views of an embodiment of the present invention;

FIG. 4 is a floor view of the above embodiment;

FIG. 5 shows a longitudinal section of the above embodiment in taxing attitude and/or in emergency landing attitude;

FIG. 7 shows a schematic view of an embodiment of the airdynecraft showing relative forces produced by the thrust of the power plant located at the rear of the fuselage;

FIG. 8 represents a partial longitudinal section of a common leading edge slot as it is found in both wings;

FIGS. 9, 10 and 11 are three orthogonal views of another embodiment of the invention showing a larger airdynecraft of high subsonic speeds, with 400 to 450 passengers capacity and two jet engines as the power plant;

FIG. 13 is a longitudinal section of the rear portion of the larger airdynecraft.

Figure 6:
FIG. 6 shows a fuselage according to this invention made by component parts.

The airdynecraft as envisaged herein is endowed with the highest possible speed potential, appropriate to its use and magnitude of power installed, so as to achieve maximum flying efficiency and at the same time is endowed also with the design characteristics essential for the attainment of the lowest possible take-off and landing speeds, as desirable for the attainment of the highest safety factor possible. Both these high and low speed potentials, although in contrast to each other, are coexisting, in the airdynecraft, to an unparalleled degree of efficiency, since its total wetted area to usable volume and/or floor area ratios are the minimum and its usable lifting area to total wetted area ratio is the maximum that are attainable, relatively to aspect radio adopted, irrespective of whether these ratios are compared against those pertaining to known aircraft of low or high subsonic speed characteristic; and these fundamentally important ratios characterising any aircraft type, together with the ratios $C_L/C_D$ and $C_L^3/C_D^2$ (which are also partially dependent from them) essentially represent the basic factors from which, ultimately, flight economy strictly depends.

In its frontal view, the airdynecraft may appear to be associated with an excess of air resistance, in spite of its well streamlined frame components; however its frontal view misleads grossly if it is being evaluated at a drag producing factor.

In fact provided that the aircraft fuselage 1, and its wings 2, 3 (forming a single body) change very gradually in cross-sectional area and longitudinal profile and provided that the longitudinal rates of change of the width and depth of the fuselage, occurring under the wings (in a cascade of airfoils), balance each other appropriately so as to blend gently with the gradually increasing or decreasing rates of change superimposed by the wings (thus minimising the losses in the airflow momentum for vorticity and swirl which may be induced by any abrupt acceleration of local masses of fluid), then the aerodynamic drag of the aircraft would be zero, if it were invested by a fluid hypothetically inviscid and incompressible and its attitude were such of producing neither positive nor negative lift.

This zero drag condition (relative to the above-mentioned assumptions) would persist, irrespective of its cumbersome frontal appearance, since the airdynecraft, characterised by the streamlined features above described, conforms strictly to the geometric rule embodied in the equation of fluid motion, due to Laplace, i.e.

$$\frac{\delta^2\phi}{\delta x^2}+\frac{\delta^2\phi}{\delta y^2}+\frac{\delta^2\phi}{\delta z^2}=0;$$

(where $$\frac{\delta\phi}{\delta x},\frac{\delta\phi}{\delta y},\frac{\delta\phi}{\delta z}$$

are the velocity components at any point X, Y, Z, on a well streamlined body not producing lift and invested by the hypothetical fluid above-mentioned).

Thus, by logical extension to practical applications, even in a stream of viscous and compressible air the dray component inherent to the airdynecraft shape and frontal appearance remains quite negligible up to the small angles of incidence of crusing flight, so long as:

a. the vortices due to the lift, which is being produced at cruising incidence, are generating only a small amount of induced drag (as it is obtainable through a set of shoulder wings in cascade of an appropriate aspect ratio A, according to the relation: induced drag, $$C_{Di}=e\cdot C_L^2 \cong 1.1\frac{C_L^2}{\pi\cdot A});$$

b. the drag component due to viscosity (friction drag) is generated by a nearly total laminar airflow, free of eddying motions and swirls (due to surface roughnesses); in which case such drag component is simply a function of the wetted area, of the airdynecraft, irrespective of its frontal appearance;

c. the speed is not greater than 70% (0.7M) of the speed of sound; that is, up to speeds at which bodies in motion do not affect appreciably the first degree of flexibility of the atmospheric environment; (flexibility enabling every physical distrubance of the environment to travel spontaneously at constant speed through intramolecular compressive and tensile impulses without displacement of matter, therefore with minimal expediture of energy).

Figure 10:
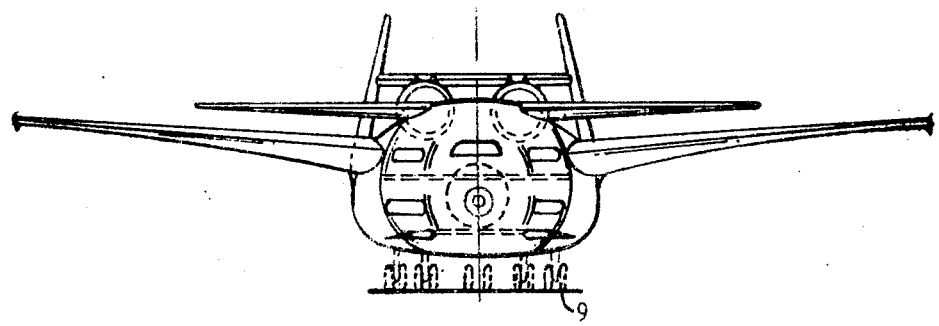

From perusal of FIGS. 9, 10 and 11 of the attached drawings it should be noted that above speeds of 0.7M. and up to the vicinity of speed of sound, that is, when the rate of increase of the drag (relative to compressibility and tensibility of the atmospheric environment) becomes more and more effective and increasingly dependent of the maximum cross-sectional area of any aircraft that flies at those speeds or faster (irrespective of whether such area is formed mostly by the fuselage or mostly by the remaining components) the airdynecraft as envisaged herein maintains the constant advantage of being endowed $C_L/C_D$ and $C_L^3/C_D^2$ ratios consistently better than the equivalent ratios pertaining to any other comparable payload capacity aircraft of conventional type, since its maximum cross-sectional area is approximately equal to, if not small than, the maximum cross-sectional area of the above mentioned conventional aircraft and accordingly even its total aerodynamic drag (due to compressibility and tensibility effects, to the wetted area and to the lift produced) will be equal to, it not smaller than, the drag produced by such conventional types. On the other hand the lift generated by the airdynecraft is in a greater proportion due to its fuselage (whose wetted area is efficiently exploited for the generations of such a lift and whose position in respect of the wings grants the full recovery of the upper airflow momentum losses due to the tandem wings in cascade of airfoils) as well as generation of additional airflow momentum above the fuselage rearward of the forward wing and above the central portion of the rear wing and therefore this lift is bound to be higher than the lift generated by conventional aircraft whose large wetted area of fuselage does not contribute to the generation of lift. Therefore even about 0.7M. speeds and up to the speed of sound the airdynecraft has the basic characterisitic required for flying more efficiently than any of the existing conventional aircraft.

In FIGS. 1 and 9 the main aerodynamic chord 11 of the front wing and the main aerodynamic chord 12 of the rear wing form zero to small negative angles of incidence, in respect of zero lift angle 13 of the fuselage, in a manner to exploit the wetted area of the fuselage as a means of generating a large amount of lift, without an excessive induced drag. The power plant 7 is positioned as far back as practical on top of the rear section of the fuselage such that as shown in FIG. 7 the resultant thrust 18 of the power plant would produce a nose down pitch effect about the centre of gravity 15 of the airdynecraft to be exploited as a means for obtaining additional useful lift 16, thus creating a resultant 17 passing as close as possible to the centre of gravity, in accordance with the remaining pitching moments.

In FIG. 3 there is shown the main stream 33 of the airflow above the fuselage 1 being further energised by the side airflow streams 32 (only depicted on one side of the aircraft) activated by the front wings 2 and the upper surface of the rear wings 3 thereby increasing substantially the lifting potential of the fuselage. The tapered sides 1A and 1B of the fuselage 1 cooperate with the wings 2 and 3 and th spanwise gap therebetween to direct the side airflow streams 32 as shown in FIG. 3 to provide a blending with the main stream 33 and increased airflow momentum over the top surface of the fuselage 1 and the central portion of the rear wing 3. For maximum possible exploitation of the airflow airstream effect, it is convenient to locate the forward wing 2 at an appropriate stagger distance and higher than the rear wing in order to obtain the best possible effect from the resulting cascade of airfoils.

In FIG. 4 the seating arrangement of a small airdynecraft is shown, according to the teachings of this invention, which can carry 9 people as well as large luggage compartments 21 and 22.

FIG. 5 shows the resultant force 20 which would occur in short landing conditions. In an emergency landing the plane can land on a skid 10 so as to shorten the landing run for safety.

The relationship of the wings 2 and 3 with the upper surface of the fuselage is shown in FIGS. 2 and 6. The two comparatively small span shoulder type wings are carried at the level of the upper surface of the fuselage in tandem and cascade. The uper surface of the rear wing blends smoothly with the side and top surfaces of the fuselage, and the surfaces of the fuselage below the rear wing meet with normal continuity with the under surface of the rear wing. In the embodiment of FIG. 9, similar wing and fuselage relationships are shown in FIGS. 10 and 11.

In FIG. 11 a view of a large passanger carrying aircraft according to this invention is shown in which a power plant 7 is supported above the fuselage, and forms a large portion of a tail lifting surface 8 which is connected to the fin and rudder surfaces 6. The fuselage trailing edge elevator 4 is hinged to the fuselage 1 between the fin and rudder surfaces 6. The outer section of the rear wing has the same shape as the forward wing 2. A Canard surface 27 may be fitted ahead and below of the forward wing 2 so as to gain additional rotating moment and lift especialliy in take-off-landing conditions.

Figure 12:
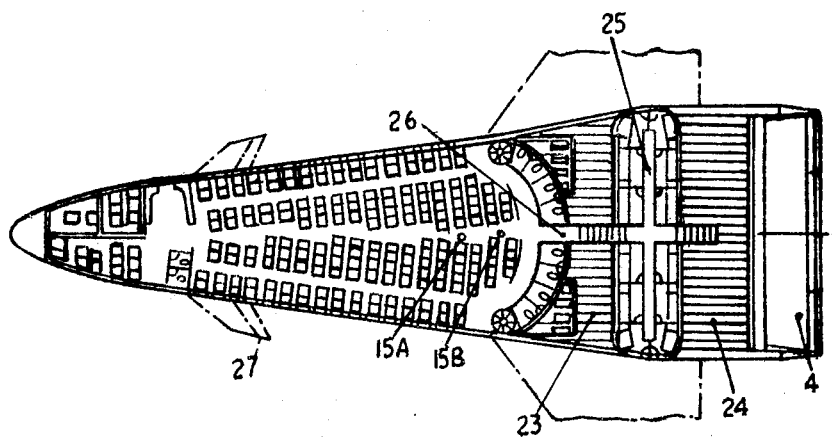
FIG. 12 is a floor view of the airdynecraft of FIGS. 9 to 11.

FIG. 12 shows the upper and lower deck floor view (which are almost identical except for their most forward portion 30 and 31, representing respectively the flying deck and a small cabin on upper deck and a single larger cabin on the lower deck) of this larger airdynecraft showing a forward pressurized passenger compartment connected by a pressurized passageway 26 to a cylindrically shaped rear compartment 25. All outer surfaces of the passenger compartments being curved as shown also by FIG. 10, so that the passenger areas exhibit the high pressure strength in relation to weight of material used, as required for flying at high altitudes.

The cylindrical compartment 25 may subdivide in two portions 23, 24, the otherwise very large luggage compartment which does not have to be pressurized. The cylindrical cmpartment 25 could be used either as a normal passenger's cabin or as sleeping compartments.

15B represents the centre of gravity for unloaded conditions. As a result of the triangular distribution of payload, there is only a comparatively small shift of the centre of gravity at all up weight 15A from that of empty condition 15B.

FIG. 13 shows in side elevation how the passenger area is divided into an upper and a lower deck 28 and 29 respectively as mentioned above. The two decks as described herein, combined with the payload triangular distribution, enable the airdynecraft to carry approximately twice as many passengers that can be carried in the same length and power on aircraft of a conventional design.

In conclusion this invention, representing a fair amount of research work and testing, relates to aeroplanes of unconventional design which nevertheless, are endowed with an economic potential by far greater than that pertaining to presently known conventional aircraft of equivalent empty weight and power; and furthermore, they offer an unparalled degree of safety, irrespective of whether they are exploited in civil or military operations.

What I claim is:

1. An aircraft comprising a narrow delta planform fuselage whose longitudinal section contours form low drag-high lift aerodynamic airfoils, said delta planform fuselage carrying two comparatively small span shoulder type wings at the level of the upper surface of the fuselage in tandem and in cascade, the rear wing being of larger span than the forward wing, the mean aerodynamic chords of the wings forming zero to small negative angles of incidence in respect of the zero-lift angle of incidence of the fuselage mean aerodynamic chord, the rear wing of the aircraft being so constructed that the side and top surfaces of the fuselage blend smoothly with the upper surface of the rear wing while the surfaces of the fuselage below the rear wing meet with normal continuity with the under surface of the rear wing, the wings being positioned in tandem and in cascade so as to cause generation of additional air flow momentum above the fuselage rearward of the forward wing and above the central portion of the rear wing; a twin tail located at the rear of the fuselage with a trailing edge elevator located between the twin tail and forming the trailing edge of the fuselage; the trailing edge of the rear and forward wings being substantially at right angles to the longitudinal axis of the aircraft and said delta fuselage carrying a power plant system above the upper surface of the fuselage and as far as stability requirements permit rearward in respect of the centre of gravity of the aircraft.

2. An aircraft according to claim 1 wheren said power plant system comprises a single engine supported above the upper surface of the fuselage by struts.

3. An aircraft according to claim 1 wherein said power plant system comprises two engines located side by side forward of each tail and having the thrusts of both engines directed symmetrically rearward at a small angle in a horizontal plane away from the longitudinal axis of the aircraft.

4. An aircraft according to claim 3 wherein said wings are provided with leading edge slots.

5. An aircraft comprising a narrow delta planform fuselage whose longitudinal section contours form low drag-high lift aerodynamic airfoils, said delta planform fuselage carrying two comparatively small span swept back shoulder type wings at the level of the upper surface of the fuselage in tandem and in cascade the rear wing being of larger span than the forward wing, the means aerodynamic chord of the shoulder type wings forming zero to small negative angles of incidence in respect of the zero-lift angle of incidence of the fuselage means aerodynamic chord, the wings being positioned in tandem and in cascade so as to cause generation of additional airflow momentum above the fuselage rearward of the forward wing and above th central portion of the rear wing, said rear wing and said fuselage being so designed that the upper and side surfaces of the fuselage blend smoothly with the upper surface of the rear wing, while the surfaces of the fuselage below the rear wing meet with normal continuity with the under surface of the rear wing; a twin tail located at the rear of the fuselage with a trailing edge elevator between said twin tail and forming the trailing edge of the fuselage and said delta fuselage carrying a power plant system above the upper surface of the fuselage and as far rearward as stability requirements permit, and being directly supported by means of an aerodynamic surface attached between the twin tail.

6. An aircraft according to claim 5 wherein the fuselage has an upper and lower deck in the forward portion of the fuselage which is fully pressurized and has a rear portion of the fuselage being unpressurized.

7. An aircraft according to claim 6 wherein said aircraft includes a small canard surface ahead of the front wing.

8. An aircraft according to claim 7 wherein said power plant comprises two jet engines located in side by side relationship and having the thrust of both engines directed symmetrically rearward at a small angle in a horizontal plane away from the longitudinal axis of the aircraft.

9. An aircraft according to claim 8 wherein said wings are provided with leading edge slots.

* * * * *